United States Patent
Devjibhai

(10) Patent No.: US 12,441,026 B2
(45) Date of Patent: Oct. 14, 2025

(54) METHOD FOR MANUFACTURING BUILDING ELEMENTS

(71) Applicant: Ekotekt AB, Helsinki (FI)

(72) Inventor: Abhishek Kumar Devjibhai, Helsinki (FI)

(73) Assignee: Ekotekt AB, Helsinki (FI)

( * ) Notice: Subject to any disclaimer, the term of this patent is extended or adjusted under 35 U.S.C. 154(b) by 0 days.

(21) Appl. No.: 19/099,121

(22) PCT Filed: Jul. 27, 2023

(86) PCT No.: PCT/FI2023/000005
§ 371 (c)(1),
(2) Date: Jan. 28, 2025

(87) PCT Pub. No.: WO2024/023392
PCT Pub. Date: Feb. 1, 2024

(65) Prior Publication Data
US 2025/0256429 A1   Aug. 14, 2025

(30) Foreign Application Priority Data

Jul. 29, 2022   (FI) ...................................... 20227104

(51) Int. Cl.
*B28B 7/34*       (2006.01)
*B28B 1/00*       (2006.01)
(Continued)

(52) U.S. Cl.
CPC .............. *B28B 7/346* (2013.01); *B28B 1/001* (2013.01); *B28B 1/008* (2013.01); *B28B 7/342* (2013.01);
(Continued)

(58) Field of Classification Search
CPC ...... B28B 7/342; B28B 7/346; B28B 13/0225
See application file for complete search history.

(56) References Cited

U.S. PATENT DOCUMENTS

2021/0354369 A1    11/2021   Guan

FOREIGN PATENT DOCUMENTS

| CN | 113414855 A | 9/2021 |
|----|-------------|--------|
| EP | 3524746 A1  | 8/2019 |

(Continued)

OTHER PUBLICATIONS

Machine language translation into English of CN113414855A.
(Continued)

*Primary Examiner* — James Sanders
(74) *Attorney, Agent, or Firm* — BelayIP

(57) ABSTRACT

This disclosure concerns use of additive manufacturing, such as 3D printing, in construction. Specifically, this disclosure concerns manufacturing of building elements using 3D printing. A method for manufacturing concrete elements for construction of buildings is also provided wherein concrete elements comprise regions of a concrete material and regions of a filler material. The disclosed method comprises at least the steps of forming a mold by printing mold walls, the mold walls delimiting a plurality of regions in the mold, pouring one of the concrete and filler materials in at least one of the regions in the mold, leaving at least one other region empty, removing at least a part of the mold walls, and pouring the other of the concrete and filler materials in at least one empty region.

5 Claims, 2 Drawing Sheets

(51) Int. Cl.
*B28B 13/02* (2006.01)
*B33Y 10/00* (2015.01)
*B33Y 80/00* (2015.01)

(52) U.S. Cl.
CPC ........... *B28B 13/0225* (2013.01); *B33Y 10/00* (2014.12); *B33Y 80/00* (2014.12)

(56) References Cited

FOREIGN PATENT DOCUMENTS

KR 101888335 B1 9/2018
WO WO2016023060 A1 2/2016

OTHER PUBLICATIONS

Machine language translation into English of KR101888335B1.
International Search Report for International Application No. PCT/FI2023/000005 from the Finnish Patent and Registration Office dated Nov. 15, 2023.

METHOD FOR MANUFACTURING BUILDING ELEMENTS

CROSS REFERENCE TO RELATED APPLICATIONS

This application is a United States national stage patent application of international patent application serial number PCT/FI2023/000005, filed Jul. 27, 2023, which claims priority to Finnish patent application FI20227104, filed Jul. 29, 2022, the content of the both of which is incorporated herein by reference.

BACKGROUND OF THE INVENTION

Field of the Invention

This invention concerns use of additive manufacturing, such as 3D printing, in construction. Specifically, the invention concerns manufacturing of building elements using 3D printing.

Description of Prior Art

Manufacturing of buildings using 3D printing of concrete is a widely experimented area. There are a lot of patents and patent applications concerning 3D printing of concrete in general: methods, compositions, nozzles, additives, and other details of the 3D printing process. Most of these focus on the traditional approach of directly 3D printing of concrete. However, building a structure using direct 3D printing of concrete has its own set of problems, as it is difficult to balance the need for fast curing so that the object being printed does not collapse during printing, with the need to have consecutive print layers bond to each other. As a consequence, printing of molds for subsequent pouring concrete is a well known application of 3D printing, which avoids the problems of printing objects directly out of concrete.

Patent EP3524746 describes a solution, where a mold is 3D-printed and left in place to act as finishing material. This patent describes fabricating building elements.

Patent application LIS2021394441 describes printing molds for concrete out of foam. This patent application is focused on details of the foam printer.

Patent application WO19121316 describes printing a free-standing mold, then pouring concrete in the mold. This application also mentions using foam as a printing material for the mold. Development of 3D printing technology has made it possible to create structures, where load bearing material is only used where needed for carrying the loads placed on the structures, with voids or lighter infill materials used for other locations. Such an arrangement saves material and reduces weight. Such structures have been experimented also in production of building elements.

For example, patent application WO22112380 describes producing elements with lighter infills by mixing foam into cement being printed when 3D printing the infill areas.

Also, a university has experimented with 3D printing of building elements by 3D printing of foam concrete as a mold, then pouring concrete into the 3D printed mold. The result is a building element with only the needed load bearing areas consisting of concrete, whereby the building element is lighter than conventional elements cast fully from concrete.

However, like 3D printing of concrete, solutions requiring 3D printing of foam concrete have certain problems. Printing foam concrete requires a complicated setup, e.g. a foam generator, and producing foam concrete requires specific training for personnel. Like 3D printing of concrete, chances of foam concrete hardening inside the printer nozzle or piping is very high. Also cleaning of the 3D printer, specifically piping and the nozzle, is difficult as it is with concrete. These solutions also require removal of printed foam concrete in cases where the building element is required to have one or more holes for e.g. windows or conduits. The removed foam concrete becomes then waste material.

SUMMARY OF THE INVENTION

An object of the present invention is to provide a method for manufacturing building elements, which avoids the problems of the prior art. In the method, mold walls are created using 3D printing. The printed mold wall structure defines the regions, where concrete and filler materials are to be poured. Then a first material of the group consisting of concrete material and filler material is poured into one or more regions, and allowed to cure. After the first material has cured, the 3D printed mold walls are removed. Then, the second material of the group consisting of concrete material and filler material is poured into at least one region left empty from the pouring of the first material and removal of the clay walls. In an embodiment of the invention, a layer of filler material is poured either first below or last on top of the whole element in order to bind regions of filler material to each other, and to improve adhesion to the regions of concrete material.

In this specification, term "concrete material" refers to any kind of concrete that is suitable for load bearing structures and can be poured into a mold. As a man skilled in the art knows, construction industry uses a variety of types of concrete. Any kind of concrete that is suitable for manufacturing building elements can be used as the concrete material in the inventive method.

In this specification, the term "filler material" refers to any material that is less dense than concrete material and can be poured into a mold. The filler material can be for example foam concrete which can be made by mixing wet concrete with aqueous foam. The filler material can also be for example concrete mixed with a lighter material such as expanded polystyrene (EPS), resulting in a mixture known as EPS concrete or polystyrene concrete.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

Various embodiments of the invention will be described in detail below, by way of example only, with reference to the accompanying drawings, of which

DETAILED DESCRIPTION OF CERTAIN EMBODIMENTS

The following embodiments are exemplary. Although the specification may refer to "an", "one", or "some" embodiment(s), this does not necessarily mean that each such reference is to the same embodiment(s), or that the feature only applies to a single embodiment. Features of different embodiments may be combined to provide further embodiments.

In the following, features of the invention will be described with a simple example of a method with which various embodiments of the invention may be implemented. Only elements relevant or illustrating the embodiments are described in detail. Details that are generally known to a person skilled in the art may not be specifically described herein.

Figure 1:
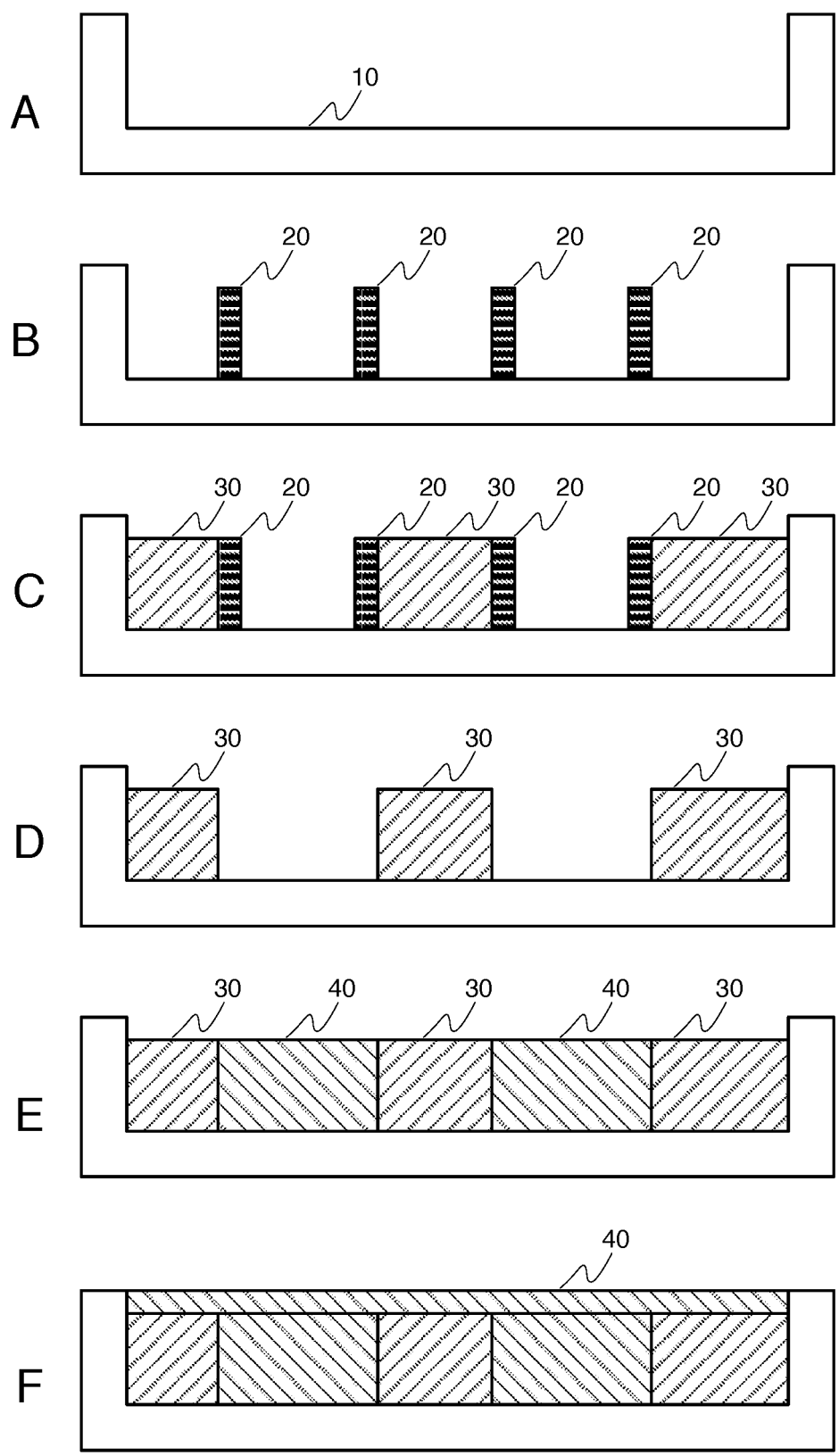
FIG. 1 illustrates different phases of manufacturing a building element according to an embodiment of the invention.

FIGS. 1 A to 1 F illustrate various phases of manufacturing a building element according to an embodiment of the invention. FIG. 1A illustrates an empty mold base 10. Clay walls are 3D printed on the mold base to form walls of the mould in which concrete and/or filler materials are poured. FIG. 1 B illustrates 3D printed clay walls 20.

In the example of FIG. 1, concrete material 30 is poured within regions defined by the clay walls 20. FIG. 1 C illustrates poured concrete material 30. After pouring of the concrete material, the concrete material is allowed to cure. After the concrete material has cured, clay walls 20 are removed. FIG. 1 D illustrates the result after removal of the clay walls 20. After removal of the clay walls 20 filler material 40 is poured into at least one region. FIG. 1 E illustrates the result after pouring of the filler material 40. Finally, in the exemplary embodiment of FIG. 1, filler material 40 is poured on top of the whole element. FIG. 1 F shows the result, a complete building element, after that step.

In an embodiment of the invention, both steps of pouring of filler material in at least one region as shown in FIG. 1 E and pouring of a layer of filler material on top as shown in FIG. 1 F are performed in one step of pouring.

Figure 2:
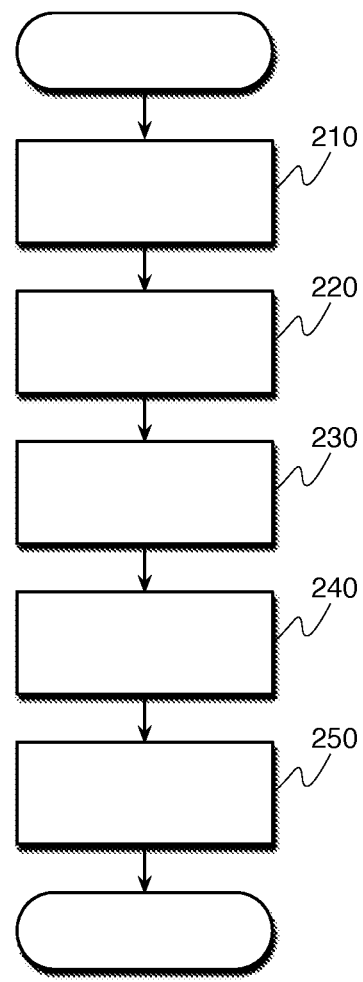
FIG. 2 illustrates a method according to an embodiment of the invention.

FIG. 2 illustrates a method for manufacturing concrete building elements according to an embodiment of the invention.

First, a mold is formed by printing 210, on a mold base, mold walls out of clay, the mold walls delimiting a plurality of regions in the resulting mold.

In the next step, a first material chosen from the group consisting of concrete material and filler material, is poured 220 in at least one region of the mold. After pouring, said first material is allowed to cure.

In the next step, at least a part of said printed mold walls are removed 230.

After removing of at least a part of the mold walls, a second material chosen from the group consisting of concrete material and filler material, is poured 240 in at least one region of the mold.

In a further embodiment of the invention, a layer of filler material is poured 250 on top of a plurality of regions of poured concrete material and filler material.

FIGS. 1 A to 1 F and associated description describe embodiments of the invention, in which the concrete material is poured first, and filler material second. However, the invention is not limited to that particular order. In a further embodiment of the invention, filler material is poured first in at least one region defined by the 3D printed clay mold walls, then the clay mold walls are removed, after which the concrete material is poured in at least one region left empty. In a further embodiment of the invention a layer of filler material is finally poured over a plurality of concrete material regions and filler material regions. In the inventive method, the way to produce a building element with an opening or a hole for example for a window or a conduit for pipes and electrical lines is simple: clay mold walls are printed to define the outline of the needed opening, and no concrete material or filler material is poured in that region of the mold, thus leaving it open.

In a further embodiment in which a layer of filler material is poured on top of the other regions of concrete and filler materials, the mold walls defining an opening are printed high enough to allow for pouring of the top layer of filler material without the filler material filling the opening during pouring. In such an embodiment, the clay walls for that opening are not removed in the step of removing a part of clay walls after pouring of the first material, but are only removed after the top layer has cured.

In an embodiment of the invention, rebar is placed within regions to be filled with concrete material after the step of 3D printing clay mold walls. Similarly, if any other steel structures such as attachment points or other hardware is needed, such hardware can be inserted in the regions to be filled with concrete material.

The specification up to this point has mostly described embodiments of the invention, in which a layer of filler material is poured on top of the element after pouring both regions of concrete material and filler material. However, in further embodiments of the invention the layer of filler material is poured on the mold base first, and after curing of the layer mold walls are 3D printed on the layer of filler material. Then the first material of the group of concrete material and filler material is poured and let cure, after which the 3D printed mold walls are removed. Finally the second material of the group of concrete material and filler material is poured and let cure.

In an embodiment in which a layer of filler material is poured on the mold base, openings can be arranged by first 3D printing of those mold walls that define the desired openings in the building element before pouring of the layer. The rest of the mold walls are then printed on top of the layer of filler material after the layer has cured. The mold base can be any surface on which clay mold walls can be printed and concrete and filler materials can be poured. FIG. 1 shows an example of the mold base as having side walls defining the edges of the building element being manufactured. However, that is only a non-limiting example of an embodiment of the invention. In a further embodiment of the invention, the mold base does not include side walls, and the edges of the building element are defined by 3D printed walls of clay, in the same way as edges of various regions within the building element are defined.

In an embodiment of the invention the clay scrap resulting from removed clay mold walls are collected and reused for another round of printing mold walls, as clay is a material that can be reused easily.

In many embodiments that are described in this specification the mold walls are printed out of clay. However, that is not the only possibility. In further embodiments of the invention any other materials that can be used for printing mold walls can be used. Examples of such other materials are various plastics, which are very commonly used in 3D printing. Also dissolvable filament materials are known, which would be easily removed after pouring the first material in an embodiment of the invention. Further, clay mixed with other materials such as fibers can also be used in an embodiment of the invention. A man skilled in the art knows many such materials, whereby they are not described in further detail here.

The invention has several benefits. The inventive method avoids the problems associated with 3D printing concrete or foam concrete.

Embodiments of the invention in which clay is used to print the mold walls have several benefits. Clay is easier and simpler material for 3D printing than concrete, foam concrete or various other filler materials. When printing mold walls out of clay, complicated machinery such as foam generators are not needed. Clay does not have as high a tendency to get hard or stick in the piping or the nozzle of the 3D printer as foam concrete has. Clay is also easier to clean from the piping or the nozzle of the printer than foam concrete. Clay is also suitable for printing with a smaller nozzle than which needs to be used for printing concrete or foam concrete, whereby the mold surfaces are much smoother than in solutions where the foam concrete or the concrete itself are used as 3D printing materials.

Embodiments using clay have also the further advantage that clay can be reused for later printing of mold walls, thereby saving material costs and decreasing the amount of waste.

The invention allows concrete and foam concrete or other filler material to be handled by pouring, which is simpler and easier than 3D printing of such materials.

Embodiments of the invention in which a layer of filler material is printed on top of the element has the benefit of binding regions of filler material to each other, and the benefit of bonding the filler material and the concrete material more strongly to each other than without such a layer. Such a layer of filler material can also provide a finishing surface for the building element.

In the following, we describe a number of embodiments of the invention.

According to a first aspect of the invention, a method for manufacturing concrete elements for construction of buildings is provided. In the method, concrete elements having regions of a concrete material and regions of a filler material are produced. According to a first embodiment of this first aspect of the invention, the method comprises at least the steps of forming a mold by printing mold walls delimiting a plurality of regions in said mold, pouring one of said concrete and filler materials in at least one of said regions in the mold, leaving at least one other region empty, removing at least a part of said mold walls, and pouring the other of said concrete and filler materials in at least one empty region. According to a second embodiment of this first aspect of the invention, the method further comprises the step of pouring a layer of filler material over a plurality of concrete material regions and filler material regions.

According to a third embodiment of this first aspect of the invention, the method further comprises the step of removing a mold wall after pouring said top layer.

According to a fourth embodiment of this first aspect of the invention, the material used in the step of printing mold walls is clay.

According to a fifth embodiment of this first aspect of the invention, the method further comprises the step of pouring a layer of filler material on the mold base before the step of pouring concrete material.

In a second aspect of the invention, a concrete element for construction of buildings is provided. According to a first embodiment of this second aspect of the invention, the concrete element is manufactured according to method of said first aspect of the invention.

In view of the foregoing description it will be evident to a person skilled in the art that various modifications may be made within the scope of the invention. While a preferred embodiment of the invention has been described in detail, it should be apparent that many modifications and variations thereto are possible, all of which fall within the true spirit and scope of the invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting. Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the previous description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. A method for manufacturing concrete elements for construction of buildings, the concrete elements comprising regions of a concrete material and regions of a filler material, the method comprising the steps of:
   forming a mold by printing mold walls delimiting a plurality of regions in the mold,
   pouring one of the concrete material and filler material in at least one of the plurality of regions while leaving at least one other region empty,
   removing at least a part of the printed mold walls, and pouring the other of the concrete material and filler material in at least one empty region.

2. The method according to claim 1, further comprising the step of pouring a layer of filler material over a plurality of concrete material regions and filler material regions.

3. The method according to claim 2, further comprising the step of removing at least a part of the printed mold walls after pouring a top layer.

4. The method according to claim 2, wherein a material used in the step of printing mold walls is clay.

5. The method according to claim 1, further comprising the step of pouring a layer of filler material on a mold base before the step of pouring one of the concrete material and filler material.

\* \* \* \* \*